United States Patent [19]

Nonweiler

[11] Patent Number: 5,483,296
[45] Date of Patent: Jan. 9, 1996

[54] HIGH RESOLUTION IMAGE STORAGE WHEREBY IMAGE IS DIVIDED AND STORED AS PLURAL GROUPS OF HORIZONTALLY AND VERTICALLY INTERLEAVABLE DATA

[75] Inventor: Brian Nonweiler, Newbury, England

[73] Assignee: Quantel Limited, Newbury, England

[21] Appl. No.: 427,492

[22] Filed: Apr. 24, 1995

Related U.S. Application Data

[63] Continuation of Ser. No. 962,306, Oct. 16, 1992, abandoned.

[30]     Foreign Application Priority Data

Oct. 18, 1991 [GB] United Kingdom ............... 9122215

[51] Int. Cl.⁶ .................. H04N 9/74; H04N 5/222
[52] U.S. Cl. ............. 348/719; 348/715; 382/298; 358/451
[58] Field of Search ............... 360/14.1, 33.1; 348/571, 578, 714, 715, 716, 717, 718, 719; 382/298; 358/451; H04N 5/14, 9/74, 5/222

[56]     References Cited

U.S. PATENT DOCUMENTS 4,628,467 12/1986 Nishi et al. ..................... 364/521
5,046,117 9/1991 Yamashita ........................ 382/47
5,077,610 12/1991 Searby et al. ................... 358/183
5,124,692 6/1992 Sasson ............................ 358/160
5,142,616 8/1992 Kellas et al. ................... 358/183
5,276,787 1/1994 Searby ............................ 395/132

FOREIGN PATENT DOCUMENTS

| 0093954 | 11/1983 | European Pat. Off. | G09G 1/28 |
|---|---|---|---|
| 0146227 | 6/1985 | European Pat. Off. | G09G 1/16 |
| 0174700 | 3/1986 | European Pat. Off. | H04N 5/262 |
| 0255280 | 2/1988 | European Pat. Off. | G06F 15/64 |
| 0280932 | 9/1988 | European Pat. Off. | H04N 7/01 |
| 2183121 | 5/1987 | United Kingdom | H04N 1/41 |
| 9120073 | 12/1991 | WIPO | G09G 1/16 |

*Primary Examiner*—Victor R. Kostak
*Assistant Examiner*—John W. Miller
*Attorney, Agent, or Firm*—Cooper & Dunham

[57]     ABSTRACT

The system comprises a memory formed of several disk stores for storing data representing at least one image and a working framestore for temporarily storing one or two frames of image data. Data in the framestore is modified by a processor under operator control. Data is stored in the disk stores by switching selected pixels from each line and selected lines from the or each frame, by way of switches and buffers, to respective disk stores such that the image data is divided into groups which each define a lower resolution version of the whole image frame.

21 Claims, 4 Drawing Sheets

| $1_1$ | $2_1$ | $3_1$ | $4_1$ | $5_1$ | $6_1$ | $7_1$ --- | --- | --- | --- | $2879_1$ | $2880_1$ |
| $1_2$ | $2_2$ | $3_2$ | $4_2$ | $5_2$ | $6_2$ | --- | --- | --- | --- | $2879_2$ | $2880_2$ |
| $1_3$ | $2_3$ | $3_3$ | $4_3$ | $5_3$ --- | | | | | | $2879_3$ | $2880_3$ |
| $1_4$ | $2_4$ | $3_4$ | $4_4$ --- | | | | | | | $2879_4$ | $2880_4$ |
| $1_5$ | $2_5$ | $3_5$ --- | | | | | | | | | |
| $1_6$ | $2_6$ --- | | | | | | | | | | |
| $1_7$ --- | | | | | | | | | | | |

$1_1\ 9_1\ 17_1\ 25_1\cdots\ \cdots$
$1_3\ 9_3\ 17_3\ 25_3\cdots\ \cdots$
$1_5\ 9_5\ 17_5\ 25_5\cdots\ \cdots$
$1_7\ 9_7\ 17_7\ 25_7\cdots\ \cdots$
⋮ ⋮ ⋮ ⋮ — 27

$1_2\ 9_2\ 17_2\ 25_2\cdots\ \cdots$
$1_4\ 9_4\ 17_4\ 25_4\cdots\ \cdots$
$1_6\ 9_6\ 17_6\ 25_6\cdots\ \cdots$
$1_8\ 9_8\ 17_8\ 25_8\cdots\ \cdots$
⋮ ⋮ ⋮ ⋮ — 28

$3_1\ 11_1\ 19_1\ 27_1\cdots\ \cdots$
$3_3\ 11_3\ 19_3\ 27_3\cdots\ \cdots$
$3_5\ 11_5\ 19_5\ 27_5\cdots\ \cdots$
$3_7\ 11_7\ 19_7\ 27_7\cdots\ \cdots$
⋮ ⋮ ⋮ ⋮ — 29

$3_2\ 11_2\ 19_2\ 27_2\cdots\ \cdots$
$3_4\ 11_4\ 19_4\ 27_4\cdots\ \cdots$
$3_6\ 11_6\ 19_6\ 27_6\cdots\ \cdots$
$3_8\ 11_8\ 19_8\ 27_8\cdots\ \cdots$
⋮ ⋮ ⋮ ⋮ — 30

$5_1\ 13_1\ 21_1\ 29_1\cdots\ \cdots$
$5_3\ 13_3\ 21_3\ 29_3\cdots\ \cdots$
$5_5\ 13_5\ 21_5\ 29_5\cdots\ \cdots$
$5_7\ 13_7\ 21_7\ 29_7\cdots\ \cdots$
⋮ ⋮ ⋮ ⋮ — 31

$5_2\ 13_2\ 21_2\ 29_2\cdots\ \cdots$
$5_4\ 13_4\ 21_4\ 29_4\cdots\ \cdots$
$5_6\ 13_6\ 21_6\ 29_6\cdots\ \cdots$
$5_8\ 13_8\ 21_8\ 29_8\cdots\ \cdots$
⋮ ⋮ ⋮ ⋮ — 32

$7_1\ 15_1\ 23_1\ 31_1\cdots\ \cdots$
$7_3\ 15_3\ 23_3\ 31_3\cdots\ \cdots$
$7_5\ 15_5\ 23_5\ 31_5\cdots\ \cdots$
$7_7\ 15_7\ 23_7\ 31_7\cdots\ \cdots$
⋮ ⋮ ⋮ ⋮ — 33

$7_2\ 15_2\ 23_2\ 31_2\cdots\ \cdots$
$7_4\ 15_4\ 23_4\ 31_4\cdots\ \cdots$
$7_6\ 15_6\ 23_6\ 31_6\cdots\ \cdots$
$7_8\ 15_8\ 23_8\ 31_8\cdots\ \cdots$
⋮ ⋮ ⋮ ⋮ — 34

FIG. 4

HIGH RESOLUTION IMAGE STORAGE WHEREBY IMAGE IS DIVIDED AND STORED AS PLURAL GROUPS OF HORIZONTALLY AND VERTICALLY INTERLEAVABLE DATA

This is a continuation of application Ser. No. 07/962,306 filed Oct. 16, 1992 now abandoned.

The present invention relates to an image processing system.

A video graphics system is described in our British Patent No. 2,089,625 and corresponding U.S. Pat. No. 4,514,818, the teachings of which are incorporated herein by reference. This system includes a touch tablet and stylus combination for generating position signals designating the position of the stylus relative to the touch tablet. The user or operator paints or draws (hereinafter referred to simply as "paints") by selecting a colour and a so called brush distribution from a range of predefined colours and distribution functions. Movement of the stylus relative to the touch tablet causes the generation of a series of position signals.

The system also includes a pixel processing circuit and a frame storage means which can store an array of pixels representing a picture. On moving the stylus to designate different positions, a patch of pixels in the frame storage means referenced by each designated position is modified in response to the selected colour and distribution. All the pixels in the frame storage means, representing the picture, can moreover be read repeatedly and applied to a monitor to display the picture as it is built up by the operator.

It is important to the artist that the monitor should display the build-up of the picture virtually in real time, which means in practice that the processing of all the patches of pixels which may be identified by position signals in a frame period should be completed, and the pixels written in the picture store (without interfering with reading from the store to the monitor) also within a frame period, at least when the time is averaged over a few frame periods. The number of pixels to be processed is dependent on the number of picture points required per unit of picture area, that is to say on the resolution of the system; if the resolution is increased, the number of position signals generated for a given movement of stylus, or in a given time interval is also increased, as is the number of pixels in a given brush patch. Real time processing can usually be achieved in systems operating to television standards, including even the high definition standard of 1250 lines per field at 50 fields per second, or 1125 lines/60 fields, though difficulties are encountered as the resolution, and hence the amount of data that is required to be manipulated, increases.

To reduce these problems it has previously been proposed that the painting or drawing (hereinafter simply "painting") should be performed with the resolution of commercially available TV-type monitors.

In our British Patent Application No. 2244111 we describe a system provided with a framestore and a viewing store. The framestore is arranged to receive new image data created by a processor in response to user manipulations of a stylus/touch tablet device. The framestore and the viewing store both have the capacity to store a high definition image and to facilitate display of the image on a high definition monitor the framestore is arranged to transfer only portions of its data contents to the viewing store during a frame period. The portion transferred is determined by the position of the stylus on the touch tablet at the beginning of a frame period. Data in the viewing store is output in raster sequence for display on the monitor.

In equipment according to our British patent no. 2,089,625, as currently manufactured and sold, additional means are provided which allow the system to be configured to perform picture composition in addition to painting. Some configurations which allow composition are described in our British patent no. 2,113,950 and in corresponding U.S. Pat. No. 4,602,286 the teachings of which are also incorporated herein by reference. In such configuration, storage means are provided having the capacity to store two independent pictures, termed herein as the foreground image and the background image respectively, and a further image which is termed the control image or stencil. The control image, like the foreground and background images, can be created by the artist, using the system in a painting mode. The control image usually comprises areas of pixels having a maximum value which represents opacity and a minimum value which represents transparency and is created so that in effect it masks a selected part of the foreground image while exposing the remainder. The control image is defined by eight bits and during creation can be displayed as a single color superimposed on the foreground picture. First address means are moreover provided for reading the pixels of the foreground image and the control image in parallel from the respective parts of the storage means and applying them to a linear interpolating circuit, which is rendered operational during an image preview mode and during an image composition mode. A second address means provides the pixels in the background image also to the two interpolating means concomitantly with the reading of the foreground image pixels and the control image pixels.

The first address means is connected to a manipulator which, under stylus control or the control of other user operable means, can change the order of reading the foreground pixels and control pixels relative to the background pixels so as to effect a spatial transformation of the foreground and stencil relative to the background. Whilst the system is in preview mode, the artist can manipulate the stylus or other control means to effect a series of desired transformations such as zoom, pan, scroll, rotate, and change perspective. During a frame period the foreground image pixels in transformed order and the background image pixels are applied to the input of the first interpolating means whilst the control image is applied to a control input to act as a pixel-by-pixel interpolating coefficient. The output of the interpolating means is applied to the picture monitor and displayed, but without affecting any of the pictures as stored. The interpolation has the effect of causing the display to represent the foreground image where the control image is opaque and to represent the background image where the control image is transparent, simulating the pasting or overlaying of the part in the foreground image on the background. Using the stylus or control means to vary the spatial transformation, the artist can try various positions of the insert onto the background image from the foreground image until he perceives a desired transformation. Thereupon the artist, by producing a predetermined "stick" command, switches the system to the composition mode. The foreground image pixels and background image pixels are then read to the second interpolating means and interpolated under control of the control image pixels, the foreground image and control image pixels being read in the transformation order prescribed in the last try during the preview mode.

The features and facilities provided by the above discussed systems can be applied to television post production in the form of an editing system in which a first or foreground video clip is inserted into a second or background video clip. One such system is manufactured and sold by us under the trade mark "HARRY". In our HARRY system frames forming a video clip are digitally encoded and stored in disk stores. As is disclosed in our U.S. Pat. No. 4,688,106, the teachings of which are incorporated herein by reference, the video clips are read out of the disk stores in parallel and this enables real-time operation of the system.

The resolution at which HARRY can operate (up to the HDTV standard) is more than satisfactory when editing television pictures but is unsatisfactory for the film industry where images of high resolution are required to provide a good quality display when projected onto a large viewing screen. The solution to making electronic editing systems attractive to the film industry is therefore to increase resolution of the electronically stored image. However, as has already been mentioned hereinabove, problems are encountered as the resolution of the stored image is increased.

The present invention aims to overcome or at least reduce the above mentioned and associated problems and aims to provide a system capable of manipulating large amounts of image data apparently instantaneously.

According to one aspect of the invention there is provided an image processing system in which data defining a plurality of picture elements which together represent at least one image frame of a given resolution are divided into data groups which are distributed among respective independent storing units, the data forming each group defining a lower resolution representation of the entire image frame.

According to another aspect of the invention there is provided an image processing system in which data defining a plurality of picture elements in a plurality of lines which together represent at least one image frame is stored in a distributed store comprising plural independent storing division or devices, the system comprising switching means for switching selected pixels from each line and for switching selected lines from the or each frame to respective ones of said storing division or devices such that the image data is divided into groups which each define a representation of substantially the entire image frame.

According to a further aspect of the invention there is provided an image processing system comprising a memory for storing data representing at least one image frame; a framestore for temporarily storing at least one frame of image; a processor for processing said data in said framestore to produce modified data representing a version of said image; and means associated with said memory for dividing said data into groups which are stored separately in said memory, each group defining a lower resolution version of substantially the whole of said image.

The above and further features of the invention together with advantages thereof will become clearer from consideration of the following detailed description of an exemplary embodiment of the invention given with reference to the accompanying drawings.

Figure 1:
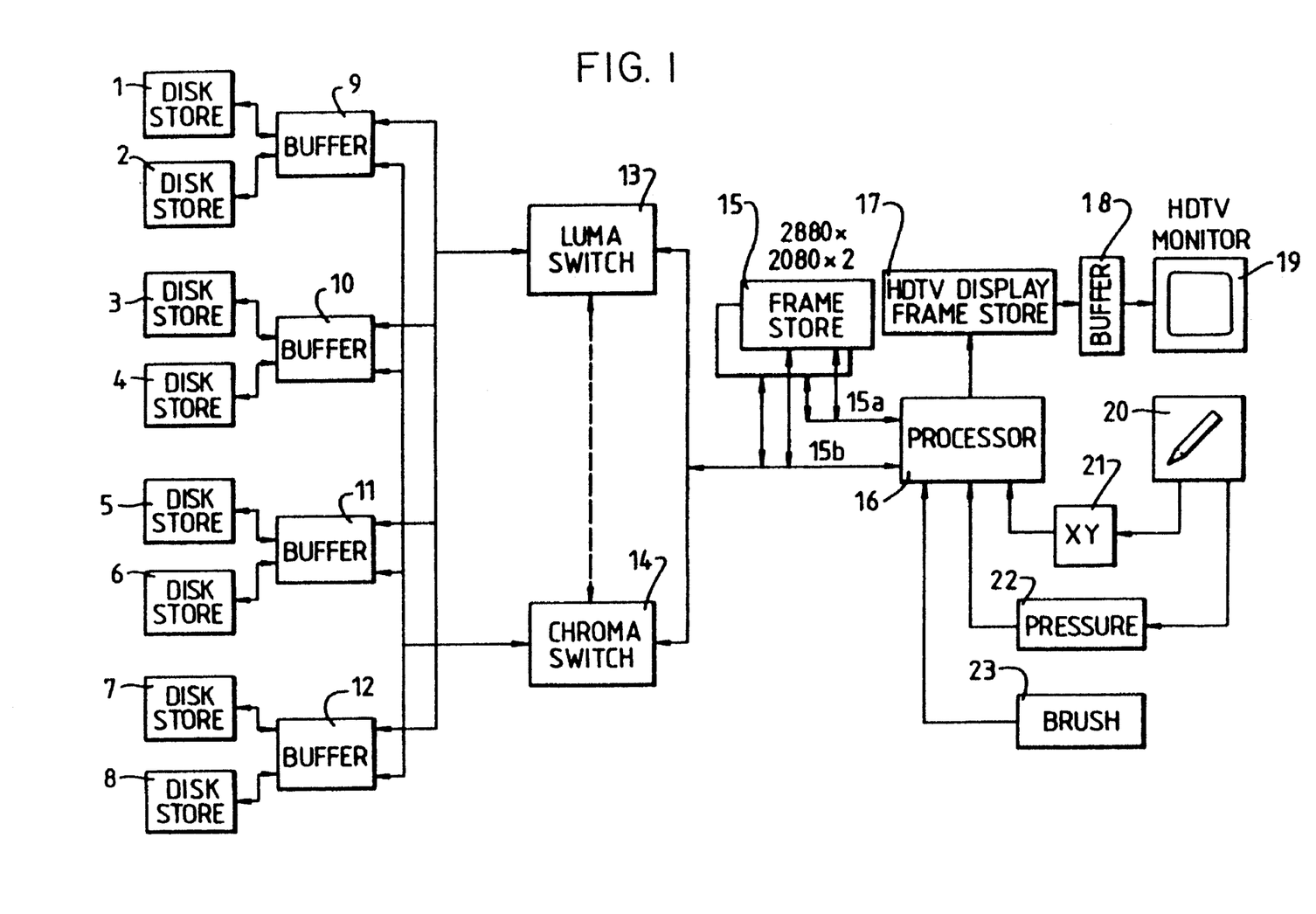
FIG. 1 is a schematic block diagram of a system embodying the present invention.

Referring now to FIG. 1 of the accompanying drawings, a video processing system comprises eight bulk stores 1 to 8 arranged in pairs for storing data representing plural video frames which together form one or more video sequences. In this example the bulk stores are disk stores and each disk store pair has a respective buffer 9 to 12 for controlling the transfer of data to and from the stores. Together the disk stores 1 to 8 are typically capable of storing data representing up to 2230 frames of video at a resolution of 2880 pixels by 2080 lines per frame, that is, four times the resolution of a typical high definition television (HDTV) standard of 1440 pixels by 1040 lines per frame.

Video data may be stored in the disk stores in any suitable format, for example RGB or YUV. In this example it is assumed that the data is stored in YUV format. Each frame is distributed among the disk format. Each frame is distributed among the disk stores 1 to 8 in a manner to be described in greater detail herein below.

The buffers 9 to 12 output luminance (Y) data to a luma switch 13 and output chrominance (U,V) data to a chroma switch 14. In one state of operation, the luma switch 13 and the chroma switch 14 cooperate to combine respective chrominance and luminance data for supply to a manipulation framestore 15, comprising two individual framestores each 24 bits deep. The manipulation framestore 15 has sufficient storage locations to store data representing two complete YUV image frames each comprising 2880 pixels by 2080 lines, together with a respective key or control image, 8 bits deep. Each of the individual framestores is moreover multi-ported, so that irrespective of any manipulation of pixels which may be occurring in a respective store, the store in use is read serially via a processor 16 into a display framestore 17. The system can also be conditioned for display of control images or key signals held in the manipulation framestore 15, either separately in monochrome or superimposed on its respective colour image frame. Image data in the display framestore 17 is at the lower HDTV resolution and is created by selectively transferring only selected data from the manipulation framestore 15 currently in use.

Data from the display framestore 17 is read in raster sequence to a buffer 18 which converts it into analogue signals for display of the video on an HDTV monitor 19. The display framestore 17 is continually updated with the particular video frame (and/or key or control signal) being manipulated at a particular time. Before such a manipulation occurs the respective frame with or without a key or control signal is transferred from the disks 1 to 8 to the framestore as above indicated via the switches 13 and 14 at the appropriate rate, say 54 MHz. After the manipulation has been completed to the satisfaction of the operator, the colour image and/or key or control image is transferred from the manipulation framestore 15 back to the bulk storage provided by the disks 1 to 8, the switches 13 and 14 during this transfer working in reverse sense.

The system further comprises a stylus/touch tablet device 20 which outputs position signals XY relating to the position of the stylus in relation to the touch tablet when the stylus is brought into the proximity of the touch tablet. When the stylus is brought into contact with the touch tablet a signal relating to the pressure applied by the stylus is also output from the stylus/touch tablet device 20. The position signals X Y and the pressure signals are delivered via respective stores 21, 22 to the processor 16.

The system shown in FIG. 1 may be configured to operate as a painting system in order to effect changes to one or more frames in a stored video sequence. In this painting mode, the operator is free to choose from a wide range of painting and other image modifying functions which are predefined in the systems. For example, the operator may select a brush from a range of painting implements predefined in a brush store 23 and may select a colour to paint with the brush; data representing the selected colour being held in a colour store in known manner. The selected brush may then be used to retouch part of a frame with the selected colour. This is achieved by making the processor 16 responsive to the stylus and touch tablet to perform a read-modify-write operation on the selected frame data held in the manipulation framestore 15. During such modification the display framestore 17 is continually updated with data from the manipulation framestores 15 under the control of the processor 16.

The two individual 24 bit framestores of the manipulation framestore 15 are connected to the processor 16 via respective lines 15a and 15b. One of the lines allows random access reading and writing from and to the storage locations within the manipulation framestore and is used by the processor 16 in executing the above mentioned read-modify-write operation. The arrangement also allows independent reading of the data in serial display order and is used by the processor 16 to update continually the display framestore 17. In order to achieve these functions, the processor 16 in fact comprises two independent processing units one dedicated to the read-modify-write drawing function and the other to the transfer of pixels for display. Since the display framestore 17 has a resolution of one quarter that of one of the individual framestores in the manipulation framestore 15, the processing unit of the processor 16 associated with the display is arranged to be transparent to only every other pixel and every other line of pixels in an image from the framestore 15 so that in effect every second pixel in both the horizontal and vertical direction is dropped from the picture before it is displayed on the HDTV monitor 19.

Modification of data in the manipulation framestore 15 is effected in real time or substantially real time when spread over several frame periods. Such modification at the rate required for the high resolution picture (2880×2080) is made possible by employing, in the read-modify-write processing unit of the processor 16, the fast processing techniques described in our European Patent Application No. 90304116.8 published as EP-A-0403054 and corresponding U.S. Pat. No. 5,276,787, the teachings of which are incorporated herein by reference. Since the display framestore 17 is continuously updated with data from the manipulation framestore 15, the image that is displayed on the monitor 19 is such that the operator may see the effect of his modifications apparently instantaneously as he manipulates the stylus on the touch tablet. Once modifications satisfactory to the operator have been made to the selected picture, the modified pixel data is written back to the disk stores 1 to 8 in a manner that will be described in greater detail hereinafter.

A large number of painting functions are predefined within the system and are available for selection and use by the operator. Such painting functions are known and well described in many of our own earlier patents and applications and in other published documents. Accordingly such functions will not be described in any further detail herein.

In the above described painting mode the system may also be employed to create a stencil or stencils to control the combining of single foreground and background images or of successive foreground and background images in a video sequence or clip. This facility is well known and is therefore not described in any further detail herein.

An image frame of 2880 pixels by 2080 lines comprises 5,990,400 picture elements and one problem with handling picture data at this level of resolution is that it is difficult, using presently available technology, to store the data in bulk storage devices or handle the data for editing or other purposes, in real time. With these and associated problems in mind, the system shown in FIG. 1 is arranged to employ a unique manner of organising image frame data in the disk stores 1 to 8.

Figure 2:
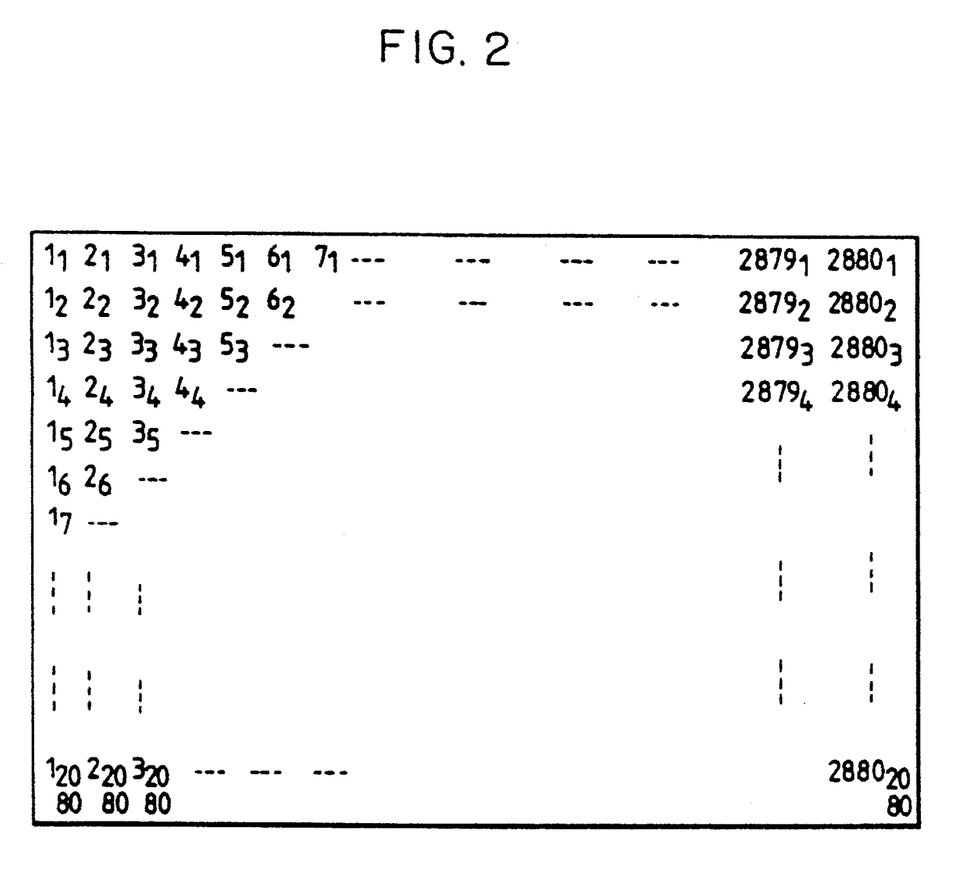
FIG. 2 illustrates data forming an image frame.

As shown in FIG. 2 of the accompanying drawings a single high resolution image frame comprises an array of picture elements starting in the top left hand corner with the first pixel in the first row, picture element $1_1$, and finishing in the bottom right hand corner with the 2880th pixel in the 2080th row, picture element $2880_{2080}$.

One way in which image frame data can be stored in the disk stores 1 to 8 will now be described with reference to FIG. 3 of the accompanying drawings. For the purpose of explanation it will be assumed that data is being transferred from the manipulation framestore 15 to the disk stores but it will be appreciated that the data may come from a different source such as an external bulk store or from film or printed picture scanners. It should also be appreciated that the reverse procedure is employed when data is transferred from the disk stores to the manipulation framestore 15.

In the transfer of a frame data from the manipulation framestore 15 to the disk stores 1 to 8, the frame is read serially to the luma and chroma switches 13, 14 a line at a time. The switches 13 and 14 distribute the pixels via the buffers 9 to 12 to different ones of the disk stores 1 to 8 and to respective divisions in the stores. Thus, for example reading of the data from the manipulation framestore 15 is arranged such that the image frame data is separated into two interleaved fields, one comprising the odd numbered lines and the other comprising the even numbered lines. At the same time the pixels in the lines are divided into two groups in order to halve the horizontal resolution of the image defined by each of the groups. One group of pixels comprises, in the case of the luma switch 13, all the odd numbered pixels in each line and the other group of pixels comprises all the even numbered pixels. In the case of the chroma switch 14 one group comprises alternative chroma pixel pairs (UV) and the other group comprises the interleaving chroma pairs. Thus, data output from the switches comprises four interleaved sets of data. Considering the luma pixels, one set comprises alternate pixels in every odd line, a second set comprises alternate pixels in every even line, a third set comprises the intervening pixels in the odd lines and a fourth set comprises the intervening pixels in the even lines. All groups relate to the same frame. The chroma pixels are similarly divided except that pixel pairs are involved instead of individual pixels. Each set of data therefore is a lower resolution version of the data in the framestore 15 and thus represents an image of a resolution similar to that of the monitor 19.

The buffers 9 to 12 each participate in a further division of the data as the data is written to the disk stores 1 to 8. The transfer of data between each of the buffers and their respective disk stores can be likened to that of a multiplexer or commutator in that for each line of data received by a buffer, e.g. buffer 11, the first pixel is delivered to a first area in a first respective disk, e.g. disk 5, the second to a second area in a second respective disk, e.g. disk 6, the third to a third area in the first respective disk and the fourth to a fourth area in the second respective disk. This commutating procedure is performed at each of the bufferes 9 to 12 and thus sixteen sub-fields of data are stored at respective areas in the disk stores 1 to 8. Thus, as shown in FIG. 3 of the accompanying drawings, disk store 1, say, receives an odd sub-field 27 and an even sub-field 28 both containing pixels numbered 1, 9, 17, 25, etc. in each line. Similarly, disk store 2 receives odd and even sub-fields 29 and 30 containing pixels 3, 11, 19, 27, etc. In each disk pair the chroma signals for each pixel are stored in one disk, eg disk 1, and the luma signals are stored in the other disk, eg disk 2.

An advantage of adopting this approach of dividing the data into sub-fields is that it places the data in a form in which it can be readily retrieved and reformed into a higher resolution image by interleaving the sub-fields to make the data suitable for writing in raster order in the framestores 15 and for display of image on a raster type display. Pairs of groups of stored data which define a picture can be displayed directly on the monitor without further alteration, since the data is already defined as two interleaved fields. Thus, for example data from sub-fields 27 and 31 in FIG. 3 could be combined to produce data for an image containing every fourth pixel in every other line or sub-fields 27, 29, 31 and 33 could be combined to produce an image containing every other pixel from every other line. The data in each group of four sub-fields, eg sub-fields 27, 29, 31, 33, is at the correct resolution for display on the HDTV monitor, namely 1440 pixels by 1040 lines and so no data compression or expansion is required prior to display of the image.

Figure 3:
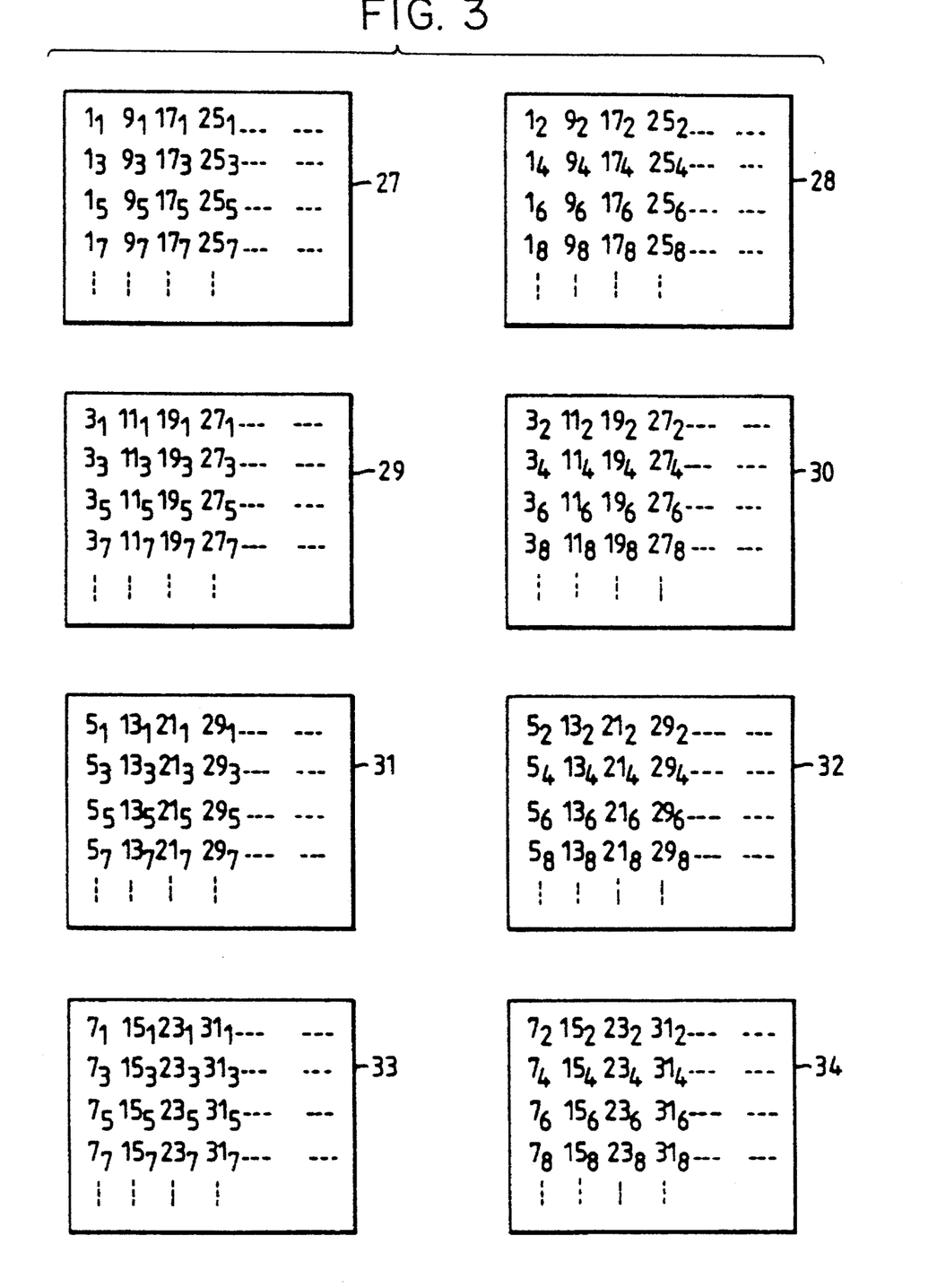
FIG. 3 illustrates the image frame data distributed among several stores.

The system shown in FIG. 1 is thus such that image data from the disk stores for selected sub-fields, eg sub-fields 27, 29, 31, 33 in FIG. 3, can written directly into the display framestore 17 by suitable control of the addressing of the disk stores 1 to 8 and buffers 9 to 12. The manipulation framestore 15 can be loaded with reduced size non-overlapping versions of a number of pictures in the bulk store to facilitate or plan the editing processing. Processor 16 may be transparent during this operation.

Figure 4:
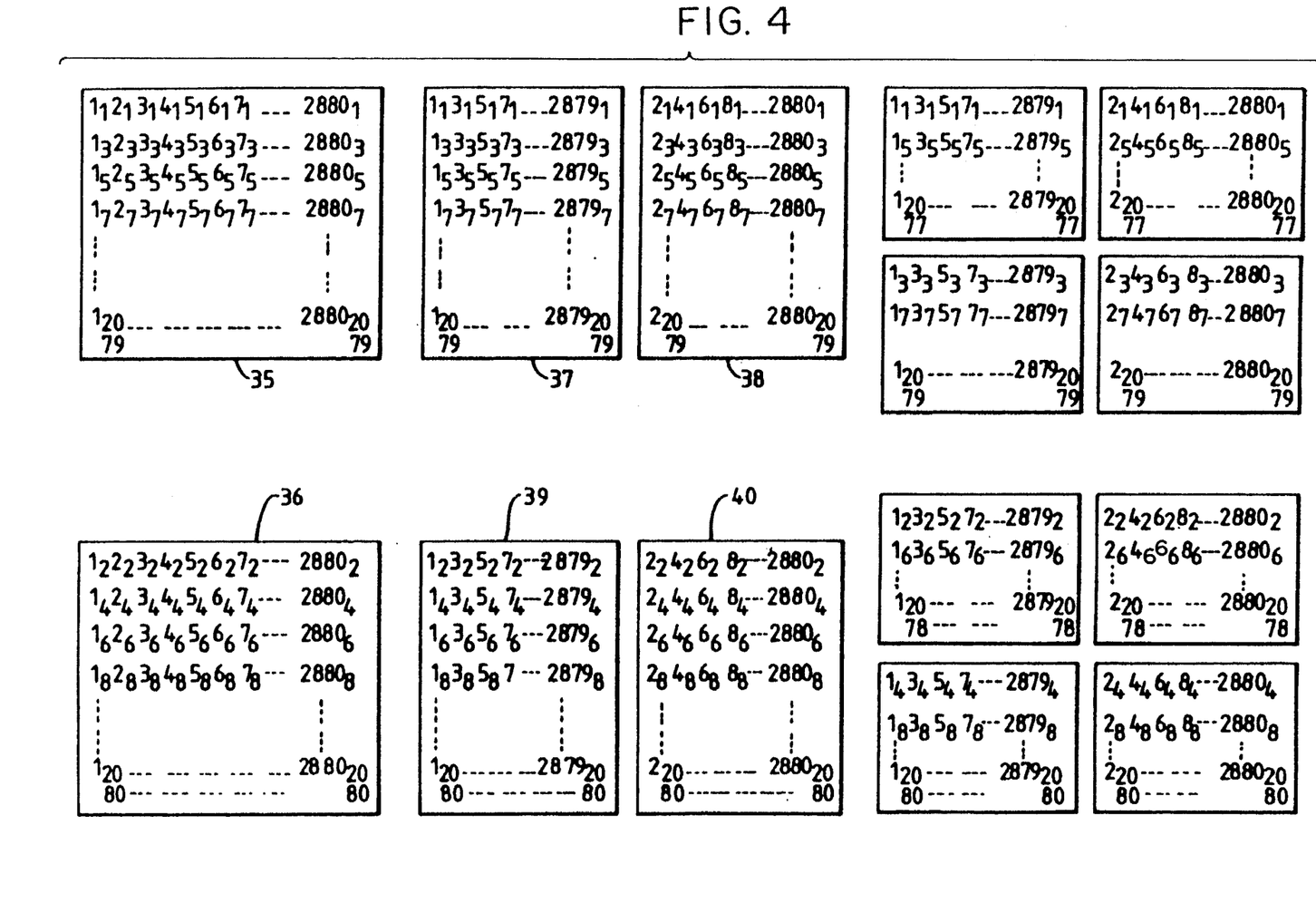

An alternative way in which image frame data can be stored in the disk stores will now be described with reference to FIG. 4 of the accompanying drawings. Again it will be assumed that data is being transferred from the framestore 15 to the disk stores and in order to simplify the description only the luma pixels will be considered. As shown in FIG. 4, the image frame of FIG. 2 is first divided vertically into two fields, namely an odd field 35 comprising all pixels in all odd numbered lines of the frame, and an even field 36 comprising all even numbered lines of the frame. Next, each field is divided horizontally into two groups comprising respectively lines of odd and even numbered pixels. Thus, the odd field 35 is divided into one group 37 comprising all odd numbered pixels on all odd numbered lines and another group 38 comprising all even numbered pixels on all odd numbered lines. Similarly, the even field 36 is divided into one group 39 comprising all odd numbered pixels on all even numbered lines and another group 40 comprising all even numbered pixels on all even numbered lines.

Each group 37, 38, 39, 40 comprises pixels which together represent the whole image. The number of pixels both horizontally and vertically in each group 37 to 40 is half that of the image frame of FIG. 2 and, thus, each group contains one quarter of the information in the image frame. Each group 37 to 40 is of a size (1040 lines of 1440 pixels) suitable for display directly on the HDTV monitor 19. The data is again divided horizontally to form a set of eight sub-fields 41 to 48 so that each sub-field comprises either alternate odd numbered lines or alternate even numbered lines and therefore corresponds to either an odd or an even field of the low (HDTV) definition image defined by the data in the respective group 37 to 40.

Although FIG. 4 shows, for the purpose of explanation, the data being divided in several stages from a single frame into the eight sub-fields 41 to 48 much of the data division is achieved simply by controlling the order in which the data is addressed to the buffers 9 to 12. As data is read from the framestore 15 all odd numbered lines of data are delivered to buffers 9 and 10 and all even numbered lines of data to buffers 11 and 12. Buffers 9 and 11 then accept all odd numbered pixel data from the lines of data delivered to them respectively and similarly buffers 10 and 12 accept data corresponding to all even numbered pixels. In this way, the data is divided directly from the complete frame as shown in FIG. 2 into the four groups 37 to 40. The final division into the eight sub-fields 41 to 48 is achieved by arranging the buffers to alternate the writing of each received line of data between its two associated stores.

Since each group 37 to 40 is delivered to a respective buffer for storage in a respective disk pair it is easy to retrieve a group quickly from the disk stores, e.g. for display on the monitor 19.

In both the FIG. 3 and the FIG. 4 procedure the data forming each group or sub-field defines a lower resolution representation of the entire image as compared to the representation of the image defined the complete frame of data. The data comprising each group or sub-field is selected such that horizontal or vertical lines of data from two or more of the groups or sub-fields can be interleaved to create a representation of the image at a higher resolution than that of the image as represented by the data in a single group or sub-field.

In addition to the above described painting mode, the system of FIG. 1 may be employed to combine a first or foreground video clip with a second or background video clip. The processor 16 comprises a menu generator (not shown) which is operable under user control to display a menu of user selectable options in a lower portion of the monitor 19. By selecting an editing mode the user conditions the system to operate as a video editing facility as described for example in our British Patent Number 2113950. In the editing mode up to 2230 frames of video data can be individually stored and retrieved from the disk stores 1 to 8. In addition to the above described data distribution, the 2230 frame locations are divided into blocks or groups of locations under user control. In a situation where two video clips are to be combined, the first clip of video is stored in a first block of frame locations and the second clip is stored in a second block of frame locations. A third block is assigned to the sequence of keying frames to be used to control the combining of the two clips and a fourth block is reserved for storing the resulting combined video clip.

The sequence of keying frames may be created automatically, such as for example a chroma key, or each keying frame may be built up individually for each of the frames in the first or second clip using any of the many well known techniques now available. Furthermore, the system is arranged so that the user can step through the combined clip, before the two clips are finally combined, to preview the result of the combining and effect changes to the keying signal before the final combination is made. In this mode of operation a foreground frame and the corresponding background frame from the disk stores 1 to 8 are transferred to the manipulation framestore 15. Thereafter, the data for the two images is read via lines 15a and 15b to the processor 16 where it is combined under the control of the corresponding keying frame. The resulting combined frame is transferred to the display framestore 17 for display of the result on the monitor 19. Each frame of the resulting combined sequence can be displayed in this way. By adding a combiner circuit (not shown) to the system, the combined sequence could be displayed at up to the full speed of the sequence, eg 25 frames per second.

During this preview mode data is required at HDTV resolution for display on the monitor 19. Because of the manner in which the data for each frame of the clips is stored there is no need to read all of the high resolution data for each frame from the disk stores 1 to 8. Instead, data for the clips is transferred only from selected sub-fields in a similar manner to that previously described herein in respect of a single frame, the combining during preview being restricted to the reduced resolution images. This method of reading data from the disk stores 1 and 2 when the system is in the preview mode substantially reduces the amount of information required to be moved around the system. As a result, individual video frames and control image frames can be read from respective blocks of the stores 1 to 8, modified and combined by the processor 16, and the result displayed on the monitor 19.

Thus, in the preview mode the user may experiment with the keying of the two clips for example, modify the or each keying frame, and see the effect of his modifications on each frame of the video clip. While he is so experimenting only HDTV resolution data is transferred from the disk stores. Once the user is satisfied with the result, the final combining of the two clips is performed by reading the data representing the first and second clips a frame at a time from their respective blocks in the stores 1 to 8 to the manipulation framestore 15. At the same time the data representing the corresponding keying clip is read from its block in the disk stores and is used as interpolation co-efficient by the processor 16 to create the combined sequence or clip a frame at a time. Each frame of the combined clip is stored at the predefined block for the combined clip in the stores 1 to 8.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof. For example, the storage of pixels in the bulk store may be organised in different divisions from those referred to above whilst retaining the advantages to be gained by the divisions.

I claim:

1. An image processing apparatus comprising:
    a memory for storing digital data representing at least one entire image frame, the memory comprising a plurality of storage units each for storing a data group defining a respective interleavable reduced resolution representation of substantially the entire image frame;
    a manipulation frame store for storing during processing data representing substantially the entire image frame;
    an interface for controlling data transfer between the memory and the manipulation frame store, the interface dividing the image frame data into said data groups when the data is transferred to the memory and interleaving groups of data from the storage units when the data is transferred from the memory;
    a processor for processing data in the manipulation frame store to create manipulated data representing a manipulated version of substantially the entire image frame; and
    a display store connected to receive from the processor data representing said manipulated version of the image for display.

2. An image processing apparatus as claimed in claim 1, wherein the interface is controlled by the processor.

3. An image processing apparatus as claimed in claim 2, wherein the processor is operable in a preview mode in which the interface is controlled to transfer selected data groups representing substantially the entire image frame at an intermediate resolution from the storage units to the manipulation frame store.

4. An image processing apparatus as claimed in claim 3, further comprising a monitor connected to the display store for displaying at said intermediate resolution the manipulated version of the image.

5. An image processing apparatus as claimed in claim 4, wherein the data stored in the memory represents the image at a resolution corresponding to cinematographic film quality and the monitor is able to display images at a resolution corresponding to that of a high definition television display.

6. An image processing apparatus as claimed in claim 1, wherein the interface is arranged to divide the image frame into an odd field and an even field respectively comprising odd and even numbered lines and to control the transfer data to the memory such that data corresponding to the even field contributes to one half of the data groups and data corresponding to the odd field contributes to the other half of the data groups.

7. An image processing apparatus as claimed in claim 6, wherein each line comprises a multiplicity of picture elements, and the interface is arranged to control said transfer of data to the memory such that even and odd numbered picture elements in each line contribute to respective different data groups.

8. An image processing system as claimed in claim 7, wherein the interface is arranged to control said transfer of data to the memory such that alternate even numbered picture elements contribute to respective different data groups.

9. An image processing system as claimed in claim 7, wherein the interface is arranged to control said transfer of data to the memory such that alternate odd numbered picture elements contribute to respective different data groups.

10. An image processing apparatus as claimed in claim 1, further comprising user operable input means for input control data, said processor being responsive to the control data to effect said creation of manipulated data.

11. An image processing apparatus as claimed in claim 1, wherein said memory is able to store data representing at least two images and said processor is adapted to combine the data representing said at least two images.

12. An image processing apparatus as claimed in claim 1, wherein said memory is able to store data representing two input video clips, a control video clip and a combined video clip, each of said clips comprising a plurality of entire image frames, and wherein said processor is adapted to combine said two input video clips in response to said control video clip in order to create said combined video clip.

13. An image processing apparatus as claimed in claim 12, wherein said memory is divided in to respective user identifiable areas for each of said two input clips, said control clip and said combined clip.

14. An image processing method comprising:
    storing in a memory digital data representing at least one entire image frame as a plurality of data groups each defining a respective interleavable reduced resolution representation of substantially the entire image frame;
    storing in a manipulation frame store data representing substantially the entire image frame in a manipulation frame store;
    transferring data between the memory and the manipulation frame store by dividing the image frame data into said data groups when the data is transferred to the memory and interleaving groups of data from the memory when the data is transferred from the memory;
    processing data in the manipulation frame store to create manipulated data representing a manipulated version of substantially the entire image frame; and transferring to a display store processed data presenting said manipulated version of the image for display.

15. An image processing method as claimed in claim 14, wherein in a preview mode selected data groups are transferred to the manipulation frame store so that the data in the manipulation frame store represents substantially the entire image frame at an intermediate resolution.

16. An image processing method as claimed in claim 15, further comprising displaying at said intermediate resolution the manipulated version of the image.

17. An image processing method as claimed in claim 16, wherein the data stored in the memory represents the image at a resolution corresponding to cinematographic film quality and the image is displayed at a resolution corresponding to that of a high definition television display.

18. An image processing method as claimed in claim 14, comprising dividing the image frame into an odd field and an even field respectively comprising even and odd numbered lines and transferring said data to the memory such that data corresponding to the even field contributes to one half of the data groups and data corresponding to the odd field contributes to the other half of the data groups.

19. An image processing method as claimed in claim 18, wherein each line comprises a multiplicity of picture elements, the method further comprising transferring said data such that even and odd numbered picture elements in each line contribute to respective different data groups.

20. An image processing method as claimed in claim 19, comprising inputting said data such that alternate even numbered picture elements contribute to respective different data groups.

21. An image processing method as claimed in claim 19, comprising inputting said data such that alternate odd numbered picture elements contribute to respective different data groups.

* * * * *